United States Patent [19]

McQuarrie

[11] 3,796,954
[45] Mar. 12, 1974

[54] WATTHOUR METER ASSEMBLY HAVING AN AUXILIARY LAG PLATE MOUNTED ON A POTENTIAL FLUX RETURN BAR

[75] Inventor: Alexander M. McQuarrie, Rochester, N.H.

[73] Assignee: General Electric Company, Pittsfield, Mass.

[22] Filed: Aug. 24, 1972

[21] Appl. No.: 283,389

[52] U.S. Cl. .............................................. 324/138
[51] Int. Cl. ............................................. G01r 11/02
[58] Field of Search .................................... 324/138

[56] References Cited
UNITED STATES PATENTS 2,871,448 1/1959 Schmidt........................ 324/138
2,022,392 11/1935 Spahn........................... 324/138 X Primary Examiner—Alfred E. Smith
Attorney, Agent, or Firm—Vale P. Myles; Francis X. Doyle; Volker R. Ulbrich

[57] ABSTRACT

An induction type watthour meter is provided with a variable resistance lag loop mounted on its potential stator, and an auxiliary lag plate, having a fixed resistance, rigidly mounted around a potential flux return bar of the meter adjacent the periphery of the rotatable induction disc of the meter. The structure and mounting arrangement of the auxiliary lag plate is such that it affords sufficient over-lagging effect to enable a meter to be adjusted so it can accurately measure power that is supplied to loads at widely different frequencies.

5 Claims, 7 Drawing Figures

WATTHOUR METER ASSEMBLY HAVING AN AUXILIARY LAG PLATE MOUNTED ON A POTENTIAL FLUX RETURN BAR

BACKGROUND OF THE INVENTION

The present invention relates to an improved induction watthour meter lag adjustment. More specifically, the invention provides an auxiliary lag plate mounted on a potential flux return bar of such a meter in order to provide sufficient lag adjustment to enable the potential flux and current flux of the meter to be adjusted into exact quadrature at operating frequencies of either 50 or 60 Hertz.

It is well known that if a watthour meter is to provide a correct registration of power consumption for varying load power factors, the potential flux of the meter must lag the current flux by exactly ninety degrees when the load monitored by the meter is at unity power factor. Both fixed and movable lag plate arrangements have been used in the past to permit such adjustments of the lag characteristics of watthour meters. An example, of a movable lag plate arrangement is disclosed in U.S. Pat. No. 2,146,606, to Trekell, which issued on Feb. 7, 1939 and is assigned to the assignee of the present invention. Fixed lagging loops may be located on either the current stator or the potential stator of a watthour meter; however, it is now fairly standard practice to mount these lag plates in a relatively fixed position with respect to the center leg of the potential stator in the manner shown, for example, in U.S. Pat. No. 2,321,437--Trekell, which issued June 8, 1943 and is also assigned to the assignee of the present invention. When such relatively fixed lag plate mounting arrangements are used, it is desirable to provide some means, such as a variable resistance loop of the type disclosed in the latter Trekell patent, to selectively adjust the induced electrical current of the lag plate, thereby to readily adjust its lag effect.

Other means are also known in the prior art for selectively adjusting a lag plate to obtain the proper phase relationship between the magnetic fluxes developed in watthour meter potential and current stators. For example, U.S. Pat. No. 2,328,728--Leippe, which issued Sept. 7, 1943, shows a lag loop that is provided with adjustable reactive means for selectively varying its impedance, thereby to enable the lagging effect of the loop to be changed. A somewhat different type of lagging method is shown in U.S. Pat. No. 3,212,005--Ramsey, Jr., which issued Oct. 12, 1965. In his lagging method, Ramsey employs a variable reluctance shunt on the meter potential stator to adjust the amount of lagging-effect current induced in a conductive tube that encircles part of the shunt. This variable shunt arrangement is, thus, functionally somewhat similar to the above-mentioned variable resistance lag plate adjustment devices.

As disclosed by the foregoing patents, it is well known that the lagging effect of a fixed lag loop can be increased for a given line voltage if the loop resistance is lowered, either by increasing the current-conducting cross section of the loop, or by using a material which has a higher electrical conductivity to fabricate the loop. However, with modern watthour meters, the first of these expedients is normally prohibited because of space restrictions imposed upon the air gap in which existing lag plates are normally mounted. And, in general, optimum current conductivity is already realized in the copper or bronze materials currently used for the manufacture of lag loops, so the second expedient does not appear to offer much hope of improvement, within present cost parameters. Therefore, when a significant amount of additional lag adjustment is necessary for a given meter, as may be the case, for example, if the meter is to be adapted for use to measure power on a system that distributes power at 50 Hertz, rather than at the more typical 60 Hertz frequency for which the meter may have been basically designed, other means must be developed to afford the required extra lagging. One such means, that is theoretically available, would be to increase the number of turns on a primary lagging loop mounted on the potential stator of a meter. As a practical matter, however, the limited space available, in the air gaps of modern meters rules this expedient out. Moreover, even if space were not a consideration, the substitution of a multiple-turn primary lagging loop, for an in-place, single-turn loop could pose a substantial renovation expense that suggests the undesirability of such an approach.

The present invention comprises a watthour meter structure that provides a magnitude of additional lag adjustment for a meter that is designed for operation at 60 Hertz, but which also may be utilized at a lower frequency. This additional means enables the potential and current fluxes of the meter to be readily adjusted into proper quadrature at the lower frequency. It will be appreciated by those skilled in the art that the additional lag adjustment means of the invention may be used to provide a magnitude of additional lagging for a 60 Hertz meter when such might be required due to, for example, a substantial change from specifications in the characteristics of a batch of iron used to fabricate the potential stator of such a meter. Of course, with the invention, the space restriction problems imposed by the air gaps of present day meters is solved.

Watthour meter structures now typically utilize a three-legged potential stator and include a potential flux return bar that provides a low reluctance path for flux between the center leg of the potential stator and its outer legs. The present invention provides a unique auxiliary lag plate mounted on such a potential flux return bar. This auxiliary lag plate is preferably formed of material, such as copper, that possesses relatively high electrical conductivity, and it is made in the form, generally, of an elongated washer. The auxiliary lag plate encircles the flux return bar and the ends of the plate are crimped after assembly to hold it securely in a fixed position, out of possible engagement with the meter disc. Ideally, the auxiliary lag plate is also secured to the flux return bar by means of an epoxy adhesive. During the operation of the meter, an electrical current is induced in the closed circuit of the auxiliary lag plate by the potential flux passing through the flux return bar. This induced electrical current provides a magnetic flux that is in phase with the flux generated by the primary lag plate on the potential stator, thus these fluxes are added phasorially and produce the desired increase in the lagging effect applied to the voltage flux generated directly in the meter disc by the potential coil.

Accordingly, it is an object of the present invention to provide an improved watthour meter assembly including means to provide a magnitude of additional lag adjustment, thereby to enable the meter to be used to accurately measure power that may be supplied over a range of operating frequencies.

A further object of the present invention is to provide a watthour meter with a unique auxiliary lag plate and mounting arrangement, which provide a magnitude of additional lag adjustment.

Another object of the present invention is to provide an auxiliary lag plate structure that is low in cost and easy to assemble into a vibration resistant operating relationship with an induction watthour meter disc.

A still further object of the present invention is to provide an auxiliary lag plate which is adaptable for use with conventional watthour meter structures and avoids any structural interference with existing operating mechanisms of such structures.

SUMMARY OF THE INVENTION

In accordance with the invention, a watthour meter that has a primary adjustable lagging loop is provided with an auxiliary lag plate in order to afford a magnitude of additional lag adjustment for the meter. The auxiliary lag plate is mounted around a potential flux return bar of the meter, so a substantial portion of the potential flux passes through it. Thus, current is induced in the auxiliary lag plate and develops a secondary component of magnetic flux which supplements the component of flux produced by the adjustable lagging loop to cause a further shift in the phase angle of the main air gap flux. In this way, the desired magnitude of additional lag effect to obtain the required potential and current flux relationship is obtained.

In its preferred form, the auxiliary lag plate is shaped as an elongated, generally U-shaped washer of considerably greater length than width. The washer is crimped onto an arcuate portion of the potential flux return bar, adjacent to the air gap of the meter; therefore, it performs its function without causing any structural interference with the rotatable disc of the meter.

DESCRIPTION OF THE DRAWINGS

The subject matter which is regarded as the invention is particularly pointed out and distinctly claimed in the claims set forth at the end of the specification. The invention, however, both as to organization and manner of use may be best understood by reference to the following description, taken in conjunction with the accompanying drawings, in which:

DESCRIPTION OF THE PREFERRED EMBODIMENT

Figure 1:
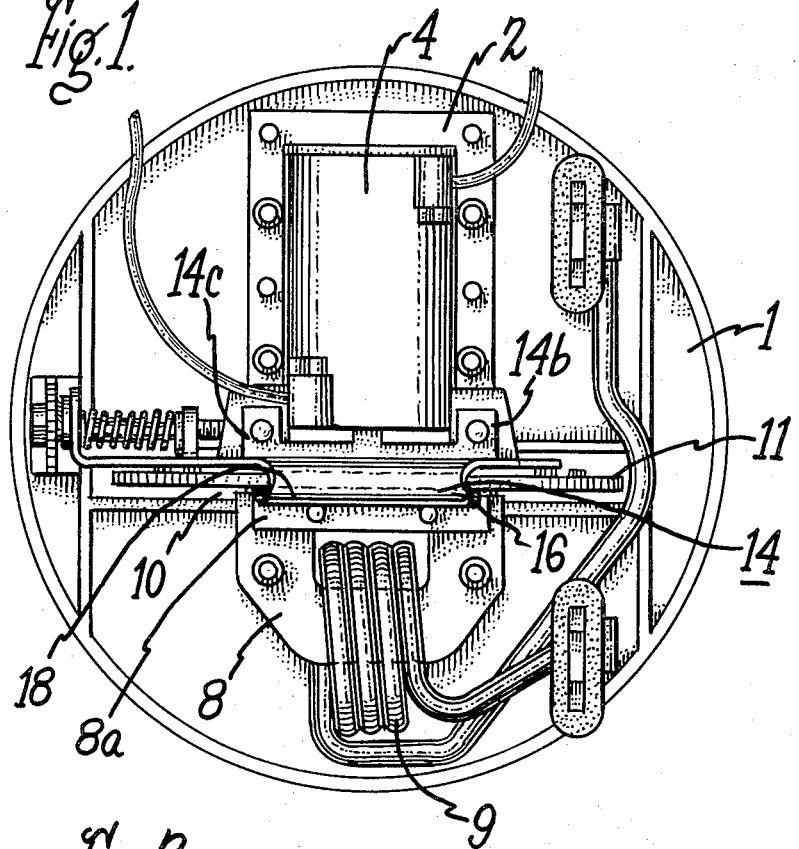
FIG. 1 is a rear elevational view, partly in section, of a watthour meter sub-assembly that includes a molded frame having a potential coil and stator and a current coil and stator mounted on it to define an air gap that is adapted to receive a rotatable meter disc. The potential stator includes a flux return bar that is provided with an auxiliary lag plate, pursuant to the teaching of the present invention.

Referring to FIG. 1 of the drawings, there is shown a sub-assembly of a conventional induction-type watthour meter. As shown, the meter sub-assembly includes a molded aluminum-alloy frame 1 having a 3-poled potential stator 2 and an insulated potential coil 4 mounted on it in fixed relationship. Also, a current stator 8 is staked to the frame 1 in spaced-apart relationship to the potential stator, so an air gap 10 is defined between the 3 poles of the potential stator 2 and the juxtaposed poles of the current stator 8. A current coil 9 is wound around the stator 8. Mounting means (not shown) are provided on the rear side of frame 1 to rotatably suspend a conventional meter induction disc 11 in operating position within the air gap 10. As is well known, when flux is induced in stators 2 and 8 by energization of their associated coils 4 and 9, it will operate to produce a shifting magnetic field that creates a torque on disc 11, causing it to rotate about its axis. The disc 11 is normally connected in a driving relationship to a suitable register mechanism (not shown) of a watthour meter in any well known manner. It should be understood that the component meter parts discussed thus far are conventional and other suitable forms of these components may be used without affecting the present invention, which will be described in greater detail below. In addition to these conventional parts, the meter sub-assembly shown in FIG. 2 includes a variable resistance lag loop 12 that is mounted in fixed relationship around the bottom portion of the center leg 3 of the potential stator 2. As best seen in FIG. 3, this primary lag loop 12 includes an enlarged flat portion 12a that has a series of holes 13 in it. The holes 13 make it easy to adjust the electrical resistance of the lag loop 13 in the well-known manner explained in detail in the above-noted Trekell Pat. No. 2,321,437.

The operating principle of induction watthour meters is well known, so it will not be explained in great detail herein. It will be understood by those familiar with the art that when a watthour meter including a sub-assembly such as that described above is connected to measure power consumption on an electric system, its current coil 9 will be placed in series (or shunt circuit relationship) with the system load current, while the potential coil 4 is connected across the load power supply line. In order for the rate of rotation of the induction disc to be a direct function of the power supplied to the load being monitored by the meter, the effective torque-producing potential and current magnetic fluxes intersecting disc 11 must be exactly in quadrature for a unity power factor load. If such a quadrature relationship is established for a unity power factor load, by adjusting the current and voltage flux relationships of the meter at the factory, the driving force applied to the disc will be directly proportional to the power measured at any load power factor.

The prior art discloses a variety of lag plate configurations and arrangements which may be mounted within a meter air gap, such as the air gap 10 of the illustrated watthour meter, to provide a suitable degree of lag adjustment for meters that are designed to be used only on a single frequency, such as 60 Hertz. However, such typical lag adjusting means are not capable of providing a range of adjustment that will enable most present-day meters to also be used to measure power on a 50 Hertz power system. To overcome this limitation, the present invention provides a meter lagging means whereby a magnitude of additional lag adjustment can be quickly and easily built into a conventional watthour meter thereby to adapt it for use with either 50 or 60 Hertz systems. This desired result is attained by mounting a novel auxiliary lag plate in a watthour meter at a point spaced away from the crowded air gap area that normally contains a primary lag loop.

Figure 2:
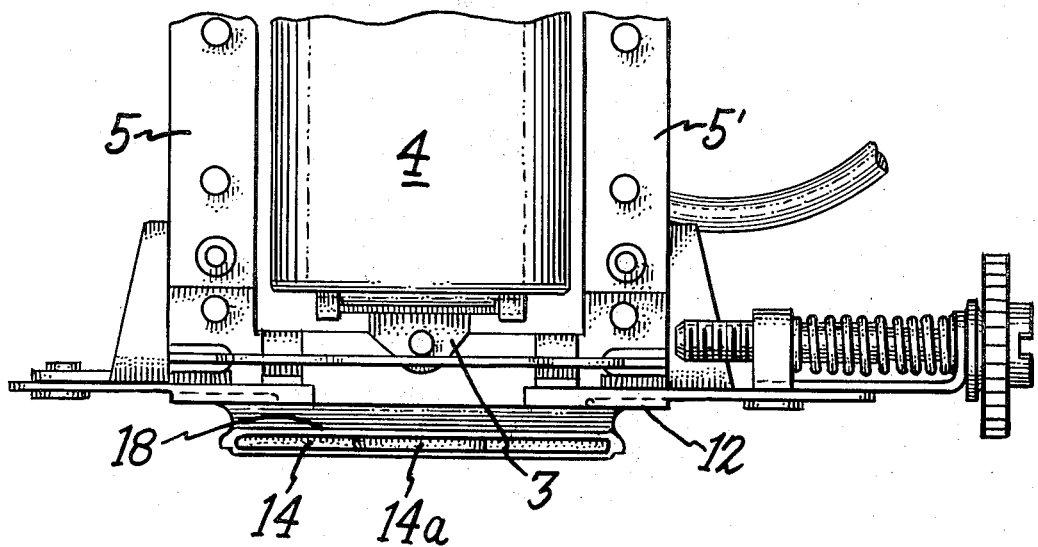
FIG. 2 is an enlarged front view of the potential coil and stator sub-assembly shown in FIG. 1.
Figure 3:
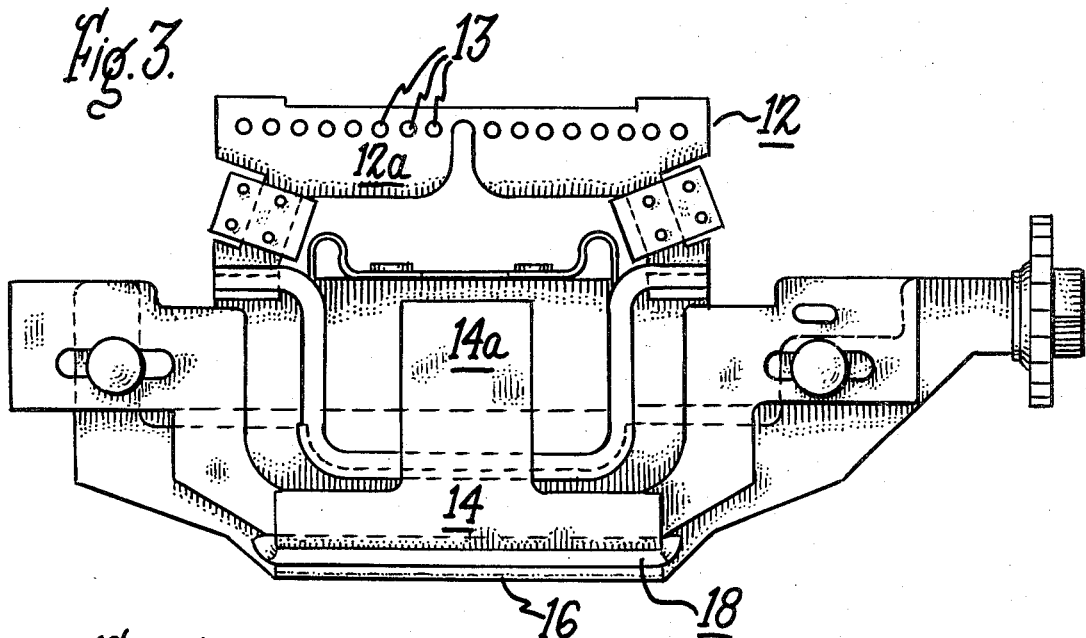
FIG. 3 is a bottom view of the watthour meter sub-assembly shown in FIG. 2.
Figure 4:
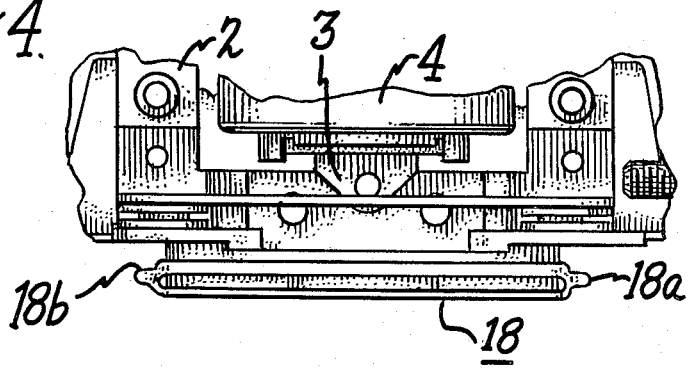
FIG. 4 is a front view of a fragment of the subassembly shown in FIG. 2, illustrating the detailed assembly of the auxiliary lag plate.
Figure 5:
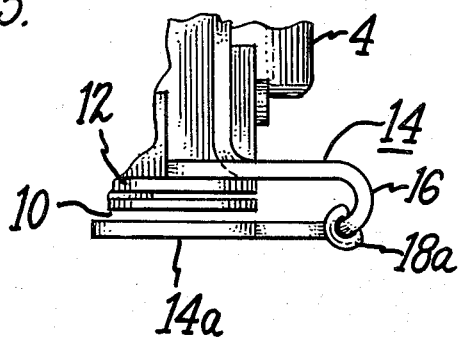
FIG. 5 is a fragmentary side view of the subassembly shown in FIG. 4.

FIG. 2 shows the potential stator 2 of the preferred embodiment of the invention as comprising a base portion having an integral center leg 3 and two outer legs 5 and 5'. In FIGS. 1 and 3, a conventional potential flux return plate, or bar, 14 is shown. Although it is conventional to refer to such flux return structures as plates, the term "bar" is used herein to avoid confusion of terminology with the auxiliary lag plate that is also described. As is typical, the bar 14 includes; a tongue portion 14a mounted in the plane of the pole faces of current stator 8, a pair of integral tab portions 14b and 14c that are staked, respectively, to the legs 5 and 5' of potential stator 2, and an arcuate portion 16 (best seen in FIG. 5) that completes a flux path between the tongue portion and tabs. Thus, the arcuate portion 16 defines a lateral limit to one side of the air gap 10. Pursuant to the invention, an auxiliary lag plate 18 is mounted on the arcuate portion 16 of the flux return bar 14. In the preferred embodiment being described, as is clearly shown in FIG. 4, this auxiliary lag plate 18 is in the form of an elongated washer and is mounted to encircle the arcuate portion 16 of the flux return bar 14.

During normal operation of a watthour meter, it is subjected to considerable vibration, thus it is important to secure the auxiliary lag plate 18 tightly against the arcuate portion 16 of the flux return bar 14, so that it cannot become dislodged and engage the edge of the meter disc 11. To effect a suitably vibration-resistant mounting, the washer-shaped plate 18 is formed into a generally U-shaped configuration about its longitudinal axis. Therefore, its flat sides substantially parallel the arcuate configuration of portion 16 of the flux return bar 14. Also, the ends 18a and 18b of the elongated washer 18 are crimped to tightly bind them to the flux return bar 14. The auxiliary lag plate 18 is further secured in place by means of a suitable adhesive, which may take the form of any well known epoxy, or the like.

It will be appreciated that this novel meter lagging arrangement has the advantage of affording sufficient lag adjustment to compensate a meter that is basically designed for use in measuring 60 Hertz power, so it may be used to accurately measure 50 Hertz power. Moreover, this advantage is attainable with the invention, without requiring any major structural changes in such a typical meter design, although the potential coil turns may be increased to ensure that the potential stator iron operates within its useable range of flux density.

Figure 6:
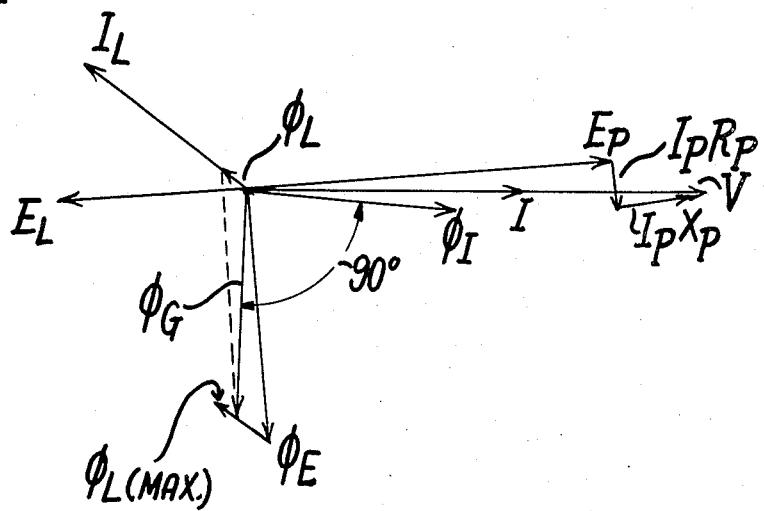
FIGS. 6 and 7 are phasor diagrams used to explain the theory and operation of the invention.
Figure 7:
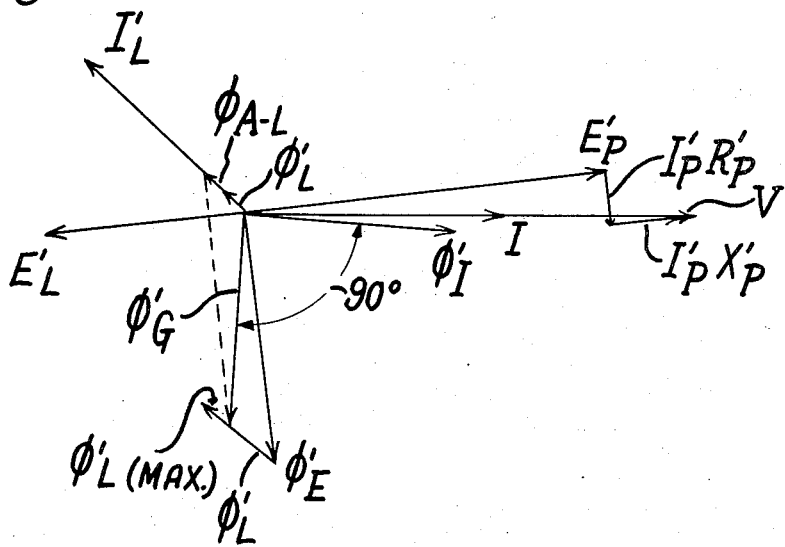

A more complete understanding of the operating principle of the invention may be attained from an analysis of the phase relationships of the torque-producing fluxes that are applied to disc 11 when the potential and current coils (4 and 9) are energized. For this analysis, reference will be made to FIGS. 6 and 7. The phasor diagram of FIG. 6 illustrates a conventional lag adjustment of the type that can be provided for the above-described meter with the primary, adjustable lag loop 12. FIG. 7 is a phasor diagram showing the added, unique lagging adjustment that is afforded by the auxiliary lag plate 18 of the invention.

In FIG. 6, a line voltage V and line current I are shown in phase to represent their relationship for a unity power factor load. As shown, the current coil flux $\phi_I$ will normally be slightly out of phase with current I, due to the effect of load shunts 8a on the current stator 8, and due to resistance losses in the current stator iron. The potential flux $\phi_E$ that would be developed in stator 2 by such an applied line voltage lags behind the current flux $\phi_I$ by an angle that is determined by the combined effect of a resistance voltage drop $I_P R_P$ and a reactance voltage drop $I_P X_P$ in the potential coil 4. Such coils normally comprise several thousand turns of insulated copper wire, therefore the magnetizing current lags the potential coil voltage $E_P$ by 90°; thus the potential flux $\phi_E$ lags the current flux $\phi_I$ by appreciably less than 90°.

Potential flux $\phi_E$ intersects the closed loop of primary, adjustable-resistance lagging loop 12 and induces a current $I_L$ in it. This current $I_L$ lags the potential flux $\phi_E$ by substantially more than 90° because of the inductive reactance of the lag loop. Accordingly, an induced flux $\phi_L$ is generated in the gap 10 which is added phasorially to the potential flux $\phi_E$. This resultant flux $\phi_G$ is shown as lagging exactly 90° behind the current flux $\phi_I$, as desired. As is well known in the wattmeter field, this precise adjustment is made by varying the resistance of the lag loop 12 in the manner explained above to allow it to carry just enough induced current to produce the amount of induced flux shown by the phasor $\phi_L$.

It will be appreciated that the maximum current that can be induced in loop 12 by a given potential flux is determined by its resistance and reactance, so there is a finite maximum inducible flux $\phi_L$ (max.) that can be attained with the primary lag loop 12. So long as a meter is to be used within a narrow range of operating frequencies, the resistance adjustment afforded by the tear strip 12a (and holes 13) in lag loop 12 is sufficient to provide adequate lag adjustment. If the meter is to be operated at a much lower frequency, such as 50 Hertz, rather than 60 Hertz, and the potential turns increased for the purpose explained above, the resultant displacement in phase relationships between current and potential fluxes is so great that adjusting induced flux $\phi_L$ to yield its maximum lagging effect will not suffice to produce the desired quadrature relationship.

FIG. 7 illustrates the phase relationship between a line current flux $\phi'_I$ and a potential $\phi'_E$ that would obtain for a meter similar to that described with reference to FIG. 6, if power at 50 Hertz was measured, assuming the meter was initially designed for 60 Hertz applications. The lower frequency and additional potential coil turns would cause the resistive component $I'_P R'_P$ and reactive component $I'_P X'_P$ of potential coil voltage to be relatively larger with respect to the same components of potential coil voltage $E_P$ shown in FIG. 6. Since the potential flux $\phi'_E$ still lags voltage $E'_P$ by approximately 90°, the degree by which $\phi'_E$ lags $\phi'_I$ is less, so more lag adjustment must be provided than in the 60 Hertz case discussed with reference to FIG. 6. This additional lag effect is supplied by the auxiliary lag plate 18 which develops a flux $\phi_{A-L}$ that is essentially in phase with the primary lagging flux $\phi'_L$ developed by loop 12. Thus, as shown by the vector addition of flux $\phi'_L$ plus $\phi_{A-L}$ the resultant potential gap flux $\phi'_G$ is brought into quadrature with the current flux $\phi'_I$, to achieve the desired objective of the invention.

It is recognized that various modifications may be made in the invention as it is described herein; therefore, it is intended to cover in the appended claims, all such modifications as fall within the true spirit and scope of the invention.

What I claim as new and desire to secure by Letters Patent of the United States is:

1. In a watthour meter sub-assembly having; a rigid frame (1) with a 3-poled potential stator (2) and a current stator (8) mounted in spaced-apart relationship thereon to define an air gap (10) between said stators, a potential coil (4) wound on said potential stator for generating a potential flux therein when energized, a current coil (9) wound on said current stator for generating a current flux therein when energized, a potential flux return bar (14) mounted on said potential stator to provide a low-reluctance path from the current stator side of said air gap to said potential stator, an induction disc (11) rotatably mounted within said air gap where it intersects said potential and current fluxes, an adjustable lag loop (12) mounted around the central pole of said potential stator, the improvement comprising an auxiliary lag plate (18) mounted in fixed position around said flux return bar at a point thereon adjacent the periphery of said disc.

2. An invention as defined in claim 1 wherein said auxiliary lag plate is in the form of an elongated, generally U-shaped washer, the sides of said washer being substantially parallel, respectively, to opposite sides of said flux return bar.

3. An invention as defined in claim 2 wherein the ends of said washer are crimped to bind said sides of the washer tightly against said flux return bar.

4. An invention as defined in claim 3 including an adhesive disposed between the washer and said flux return bar to secure the washer in fixed position around said bar.

5. An invention as defined in claim 1 wherein said flux return bar includes; a generally flat tongue positioned between two poles of said current stator, a pair of tabs staked, respectively, to the outer poles of said potential stator, and an integral arcuate portion between said tongue and tabs, said auxiliary lag plate being mounted on said arcuate portion, in a position to encircle substantially all of the potential flux passed through the flux return bar, before said flux is divided between the two outer poles of the potential stator.

* * * * *